United States Patent
Chou

(10) Patent No.: US 7,352,410 B2
(45) Date of Patent: Apr. 1, 2008

(54) METHOD AND SYSTEM FOR AUTOMATIC BRIGHTNESS AND CONTRAST ADJUSTMENT OF A VIDEO SOURCE

(75) Inventor: Chih-Hsien Chou, San Jose, CA (US)

(73) Assignee: Kolorific, Inc., Milpitas, CA (US)

( * ) Notice: Subject to any disclaimer, the term of this patent is extended or adjusted under 35 U.S.C. 154(b) by 548 days.

(21) Appl. No.: 11/142,130

(22) Filed: May 31, 2005

(65) Prior Publication Data

US 2006/0268180 A1    Nov. 30, 2006

(51) Int. Cl.
  *H04N 5/21* (2006.01)
(52) U.S. Cl. ...................................... 348/673
(58) Field of Classification Search .............. 348/673, 348/672, 674, 675, 678, 679, 687; 382/168, 382/171
See application file for complete search history.

(56) References Cited

U.S. PATENT DOCUMENTS

| | | | |
|---|---|---|---|
| 6,285,398 B1 | 9/2001 | Shinsky et al. | |
| 6,727,489 B2 | 4/2004 | Yano | 250/221 |
| 6,762,800 B1 | 7/2004 | Nie et al. | 348/687 |
| 6,771,320 B2 | 8/2004 | Choi | 348/625 |
| 2004/0164995 A1 | 8/2004 | Mori | |
| 2005/0035974 A1 | 2/2005 | Nair et al. | |
| 2006/0018538 A1* | 1/2006 | Jeffrey et al. | 382/168 |

OTHER PUBLICATIONS

Oh, E.Y. et al., "IPS-Mode Dynamic LCD-TV Realization with Low Black Luminance and High Contrast by Adaptive Dynamic Image Control Technology," Journal of the SID, Mar. 13, 2005, pp. 215-219.
Toyooka, Takashi et al., "Illumination Control System for Adaptive Dynamic Range Control," Journal of the SID, Feb. 13, 2005, pp. 105-109.

* cited by examiner

*Primary Examiner*—Paulos M. Natnael
(74) *Attorney, Agent, or Firm*—Pinnacle Patent Law Group

(57) ABSTRACT

An image brightness and contrast management module for automatically adjusting brightness and contrast of an input video signal includes a histogram generation unit that generates a pixel luminance histogram based on pixel luminance values in a frame, whereby the histogram shows a distribution of luminance values in the frame and indicates the dynamic range and the dominant luminance value(s) for the frame. The module includes a histogram characterization unit that uses the pixel luminance histogram to identify which of a plurality of brightness/contrast properties is exhibited in the frame. The module also includes a brightness and contrast adjustment unit that nonlinearly adjusts, in real-time, the pixel luminance values in a next frame based on the identified brightness/contrast properties exhibited in the preceding frame. In this manner, bright or dark dominant areas of an image are stretched to enhance the contrast of the dominant luminance values without blackening the darker portions or saturating the brighter portions of the image.

18 Claims, 12 Drawing Sheets

METHOD AND SYSTEM FOR AUTOMATIC BRIGHTNESS AND CONTRAST ADJUSTMENT OF A VIDEO SOURCE

FIELD OF THE INVENTION

The present invention relates in general to digital image and video signal processing and in particular to a digital signal processing method and system for automatically adjusting, correcting, and enhancing the brightness and contrast of a video source.

BACKGROUND OF THE INVENTION

In video standards for standard-definition (SD) and high-definition (HD) video signal transmission, a color video signal is represented by digitized samples of digital luminance, Y, and the color differences, Cb and Cr. The digital luminance and color difference values (Y, Cb, Cr) of each pixel (i.e., the pixel data) can be derived from the three primary analog signals representing RGB, i.e., $E'_R$, $E'_G$, and $E'_B$, according to world-wide video standards set forth in ITU-R BT.601 and ITU-R BT.709. Each of the values (Y, Cb, Cr) in the luminance/color differences color space is a function of all three primary analog values in the R, G, B color space. The pixel luminance data, Y, corresponds to the overall brightness of the pixel in the video signal, and is the weighted sum of the gamma-corrected RGB components of the color video signal.

The video signal is typically received by a display system, such as a television, and displayed on a display device. Typical display devices include projector displays and flat-panel displays. Projector displays, such as digital micromirror device displays (DMD), liquid-crystal displays (LCD) and liquid-crystal on silicon (LCOS) displays, utilize a lamp to provide a light source to project images onto a projection surface, such as a screen, while flat-panel displays, such as LCDs, utilize a backlight to display images for direct viewing.

The quality of the displayed images is strongly affected by the pixel luminance data from the input video signal and the brightness of the ambient lighting. For projector displays the image quality is also affected by the reflectivity of the surface onto which the image is projected. To display clear and sharp images, it is necessary to adjust the brightness and contrast of the image to compensate for the variations of the pixel luminance data from the input video signal and various ambient lighting conditions. Typically, with conventional display systems, the viewer can perform such brightness and/or contrast adjustments manually.

Nevertheless, the input video signal generally does not represent a fixed image. Rather, the images usually are changing along with the video content. Thus, oftentimes the optimal brightness and contrast for one scene will be different for another scene, e.g., one scene can include outdoor/daytime footage and the next scene can include indoor/evening footage. Moreover, conditions in the viewing environment can change, e.g., the ambient lighting in the room can change from natural light during the day to artificial light during the evening, thereby affecting the optimal brightness and contrast levels. In order to optimize the perceived image quality, the viewer would be required to adjust constantly the brightness and contrast of the display device.

Accordingly, it is desirable to provide a method and system for automatically adjusting the brightness and contrast of images from a video source displayed by a display system. The method and system should be adaptable to the video content displayed and to the viewing environment, should not require extensive computational resources, and should be efficient.

SUMMARY OF THE INVENTION

In one version, an image brightness and contrast management module for automatically adjusting brightness and contrast of an input video signal includes a histogram generation unit that generates a pixel luminance histogram based on pixel luminance values in a frame, whereby the histogram shows a distribution of luminance values in the frame and indicates the dynamic range and the dominant luminance value(s) for the frame. The module includes a histogram characterization unit that uses the pixel luminance histogram to identify which of a plurality of brightness/contrast properties is exhibited in the frame. The module also includes a brightness and contrast adjustment unit that nonlinearly adjusts, in real-time, the pixel luminance values in a next frame based on the identified brightness/contrast properties exhibited in the preceding frame. In this manner, bright or dark dominant areas of an image are stretched to enhance the contrast of the dominant luminance values without blackening the darker portions or saturating the brighter portions of the image.

In another aspect, a method for automatically adjusting brightness and contrast of an input video signal includes receiving pixel luminance values in a frame, generating, on a frame-by-frame basis, a pixel luminance histogram based on the pixel luminance values in the frame, and identifying which of a plurality of brightness/contrast properties is exhibited in the frame based on the pixel luminance histogram. The method further includes receiving pixel luminance values in a next frame, and nonlinearly adjusting in real-time the pixel luminance values in the next frame based on the identified brightness/contrast properties exhibited in the preceding frame.

DESCRIPTION OF THE DRAWINGS

These features, aspects and advantages of the present invention will become better understood with regard to the following description, appended claims, and accompanying drawings, which illustrate examples of the invention. However, it is to be understood that each of the features can be used in the invention in general, not merely in the context of the particular drawings, and the invention includes any combination of these features, where:

DESCRIPTION OF THE INVENTION

The present invention relates in general to digital image and video signal processing and in particular to a digital signal processing method and system for automatically adjusting, correcting, and enhancing the brightness and contrast of a displayed image from a video source. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

According to a version of the present invention, an image brightness and contrast management module receives pixel luminance data, $Y_{in}$, in a frame from a video source and characterizes the pixel data to estimate one or more image property parameters that are related to the brightness/contrast of the frame. For example, a property parameter can indicate whether the image in the frame is too bright or too dark, or too acute or too dull. In one version, the image brightness and contrast management module uses the property parameters to optimize the bright and dark contrast of the input image by adjusting the luminance level distribution of the pixel data of the input image according to predetermined rules. In another version, the image brightness and contrast management module also monitors the ambient light conditions and uses the property parameters as well as the ambient light level to adjust the lamp/backlight intensity of the display system. In this manner, the image brightness and contrast management module automatically adjusts, in real time, the overall image brightness and contrast such that the displayed image is true to the original scene.

Figure 1:
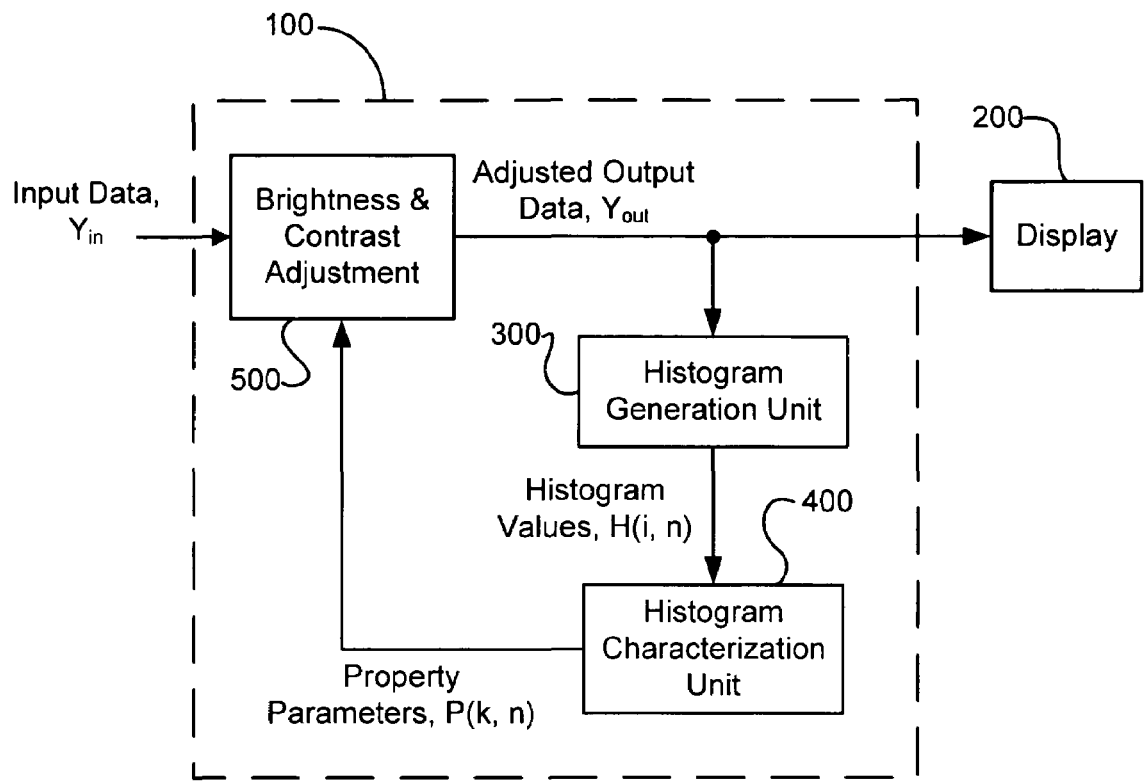
FIG. 1 is a block diagram of an image brightness and contrast management module according to a version of the present invention.
Figure 2:
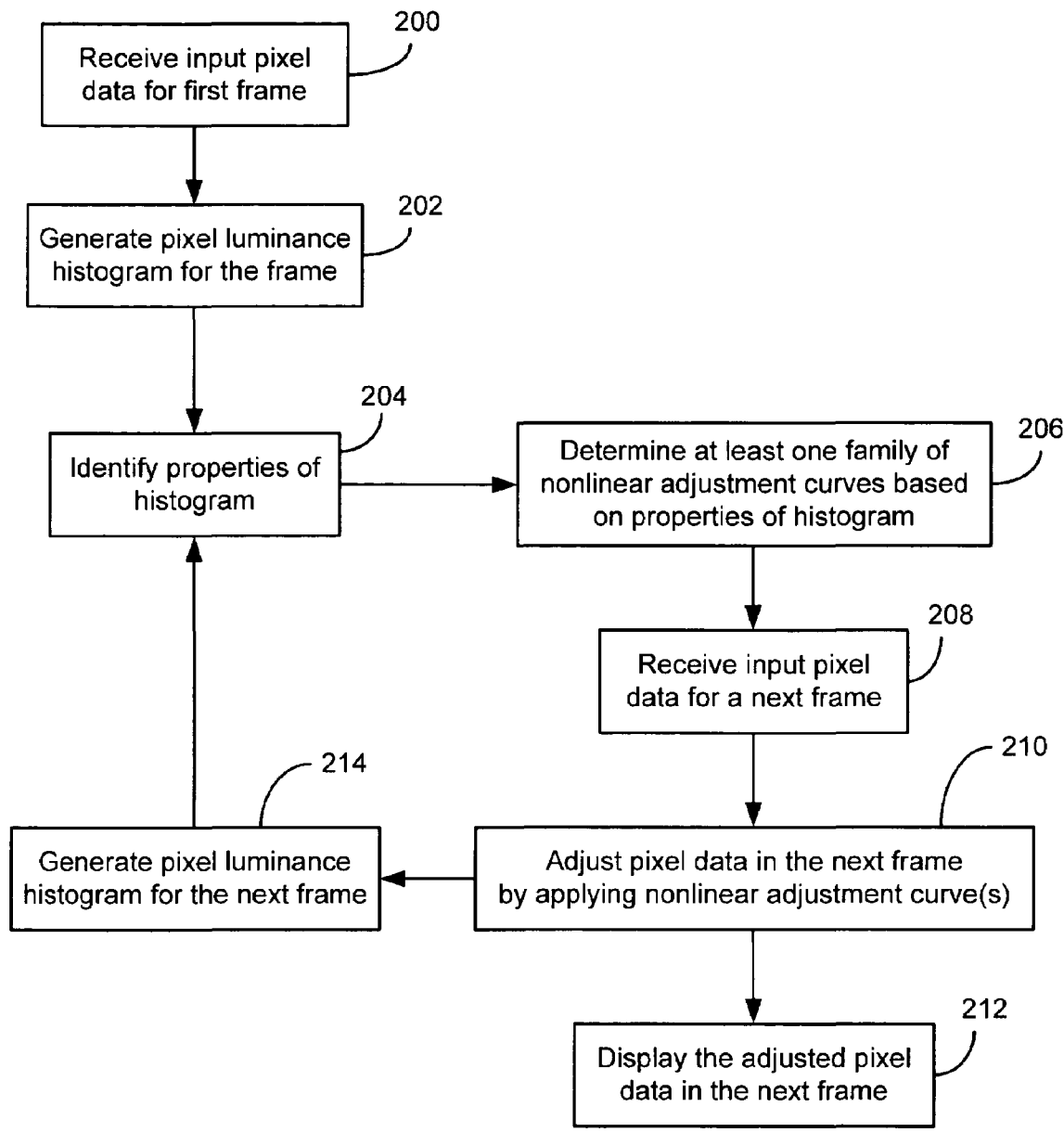
FIG. 2 is a flowchart illustrating a method of automatically adjusting brightness and contrast using the module shown in FIG. 1 according to a version of the present invention.

FIG. 1 is a block diagram of the image brightness and contrast management module 100 according to a version of the present invention. The module 100 includes a histogram generation unit 300, a histogram characterization unit 400 and a brightness and contrast adjustment unit 500. FIG. 2 is a flowchart illustrating a method of automatically adjusting brightness and contrast using the management module 100 shown in FIG. 1 according to a version of the present invention. Referring to FIG. 1 and FIG. 2, the management module 100 receives the pixel luminance data, $Y_{in}$, of a first frame from a video source (step 200). The histogram generation unit 300 evaluates the luminance data of each pixel in the frame and generates a pixel luminance histogram for the frame (step 202).

Figure 3A:
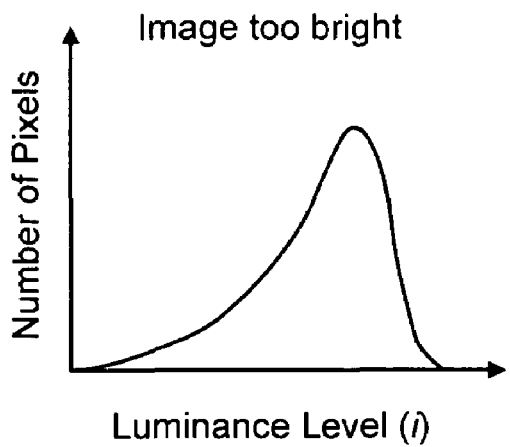
FIGS. 3A-3D are illustrations of exemplary pixel luminance histograms.
Figure 3B:
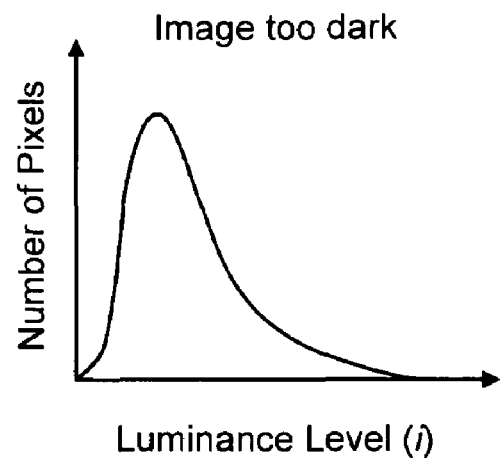
Figure 3C:
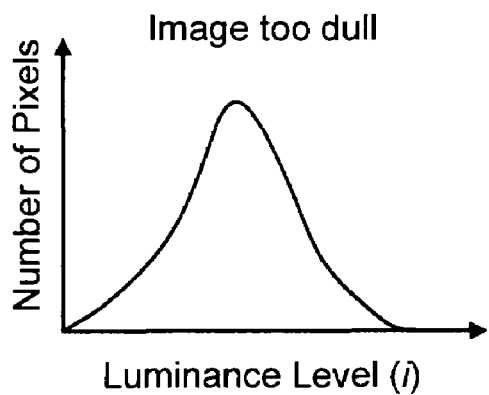
Figure 3D:
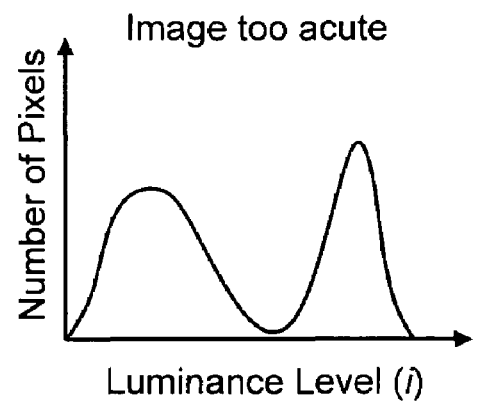

FIGS. 3A-3D are illustrations of exemplary pixel luminance histograms. The histogram represents the luminance level distribution for a frame from a video source. Depending on the shape and distribution of the curve, the brightness and contrast properties of the image in the frame can be characterized. For example, FIG. 3A is a histogram that indicates a large number of pixels having a high luminance value. Accordingly, the image in the frame is very bright. In contrast, FIG. 3B shows that the frame has a large number of pixels having a low luminance value thereby indicating that the image is very dark. FIG. 3C and FIG. 3D are characteristic histograms of images that are very dull and very acute, respectively.

Figure 4:
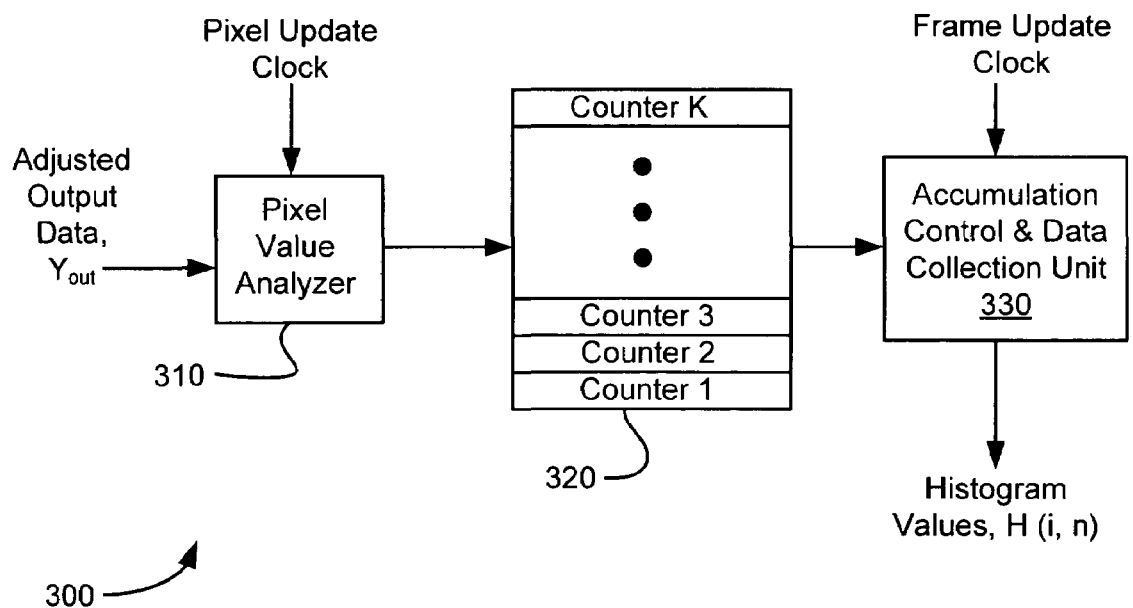
FIG. 4 is a block diagram of the histogram generation unit according to a version of the present invention.

FIG. 4 is a block diagram of the histogram generation unit 300 according to a version of the present invention. The histogram generation unit 300 includes a pixel value analyzer 310, a plurality of counters 320 and an accumulation control and data collection unit 330. The pixel value analyzer 310 receives the pixel luminance data and determines the luminance value for each pixel. Each luminance value is associated with a counter 320, which increments when the pixel value analyzer 310 receives a pixel having the corresponding luminance value. In a preferred embodiment, each counter 320 can represent a range of luminance values. The smaller the range, the greater the number of counters 320, which in turn generates a more accurate histogram. At the end of the frame, i.e., frame n, the accumulation control and data collection unit 330 collects the data from the counters 320, resets the counters before the beginning of the next frame, i.e., frame n+1, and generates and outputs the histogram values, H(i, n), for the frame.

Figure 5:
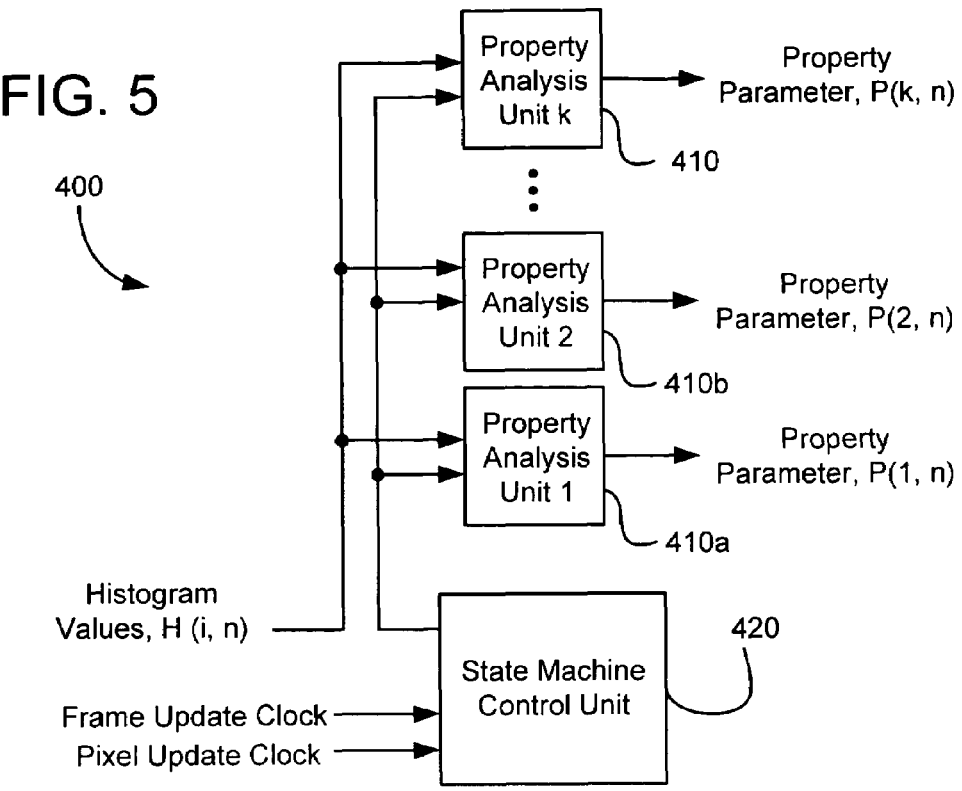
FIG. 5 is a block diagram of the histogram characterization unit according to a version of the present invention.

Referring again to FIG. 2, once the histogram generation unit 300 has generated the histogram for the frame, i.e., frame n, (step 202), the histogram characterization unit 400 evaluates the histogram values, H(i, n), to identify the properties of the histogram (step 204). FIG. 5 is a block diagram of the histogram characterization unit 400 according to a version of the present invention and includes a plurality of property analysis units 410 and a state machine control unit 420. Each property analysis unit 410 tests a particular property or characteristic related to the brightness and/or contrast of the image in the frame. For example, property analysis unit 1 (410a) can be configured to identify whether the image is too bright or too dark, and property analysis unit 2 (410b) can be configured to identify whether the image is too dull or too acute. Each property analysis unit 410 outputs a property parameter, P(k, n), for frame n that quantifies the particular property associated with the histogram. For example, if the image of frame n is too bright, property analysis unit 1 (410a) can detect this and the associated property parameter, P(1, n), can have a large positive value. Property analysis unit 2 (410b) might conclude that the same image is neither too dull nor too acute, and the corresponding property parameter, P(2, n), will be approximately zero (0).

According to a preferred embodiment of the present invention, the property parameter, P(k, n), of frame n for a particular characteristic is calculated by applying a threshold function, $T_k(i)$, to the histogram, H (i, n), to generate a modified histogram, $J_k(i, n)$. The modified histogram is then multiplied by a weighting function, $W_k(i)$. The sum of the area(s) defined by the resulting curve(s) is the property parameter, P(k, n), for frame n. The following equations apply:

$$J_k(i, n) = \max[H(i, n) - T_k(i), 0], \quad i = 1, 2, \ldots, K. \quad (1)$$

$$P(k, n) = \sum_{i=1}^{K} W_k(i) J_k(i, n), \quad (2)$$

where H (i, n) is the $i^{th}$ histogram value for frame n, and K is the number of counters.

Figure 6:
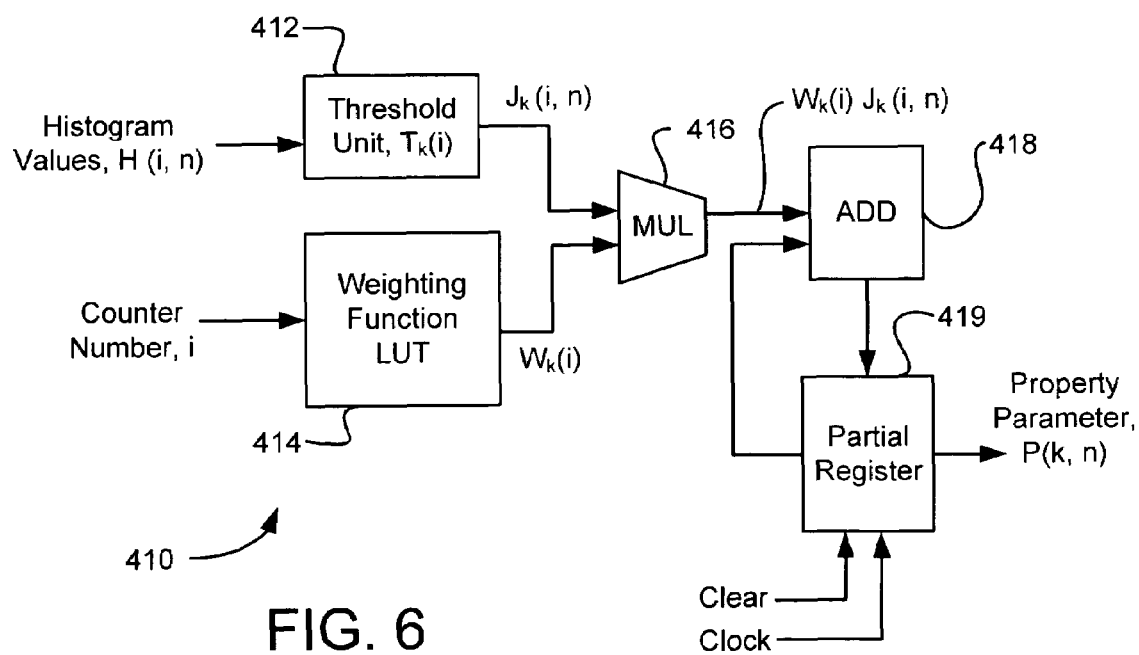
FIG. 6 is a block diagram of a property analysis unit according to a preferred version of the present invention.

FIG. 6 is a block diagram of an exemplary property analysis unit 410 according to a preferred version of the present invention. As is shown, the property analysis unit 410 includes a threshold unit 412 and a weighting function lookup table (LUT) 414. The threshold unit 412 receives the histogram values, and for each value, H(i, n), performs the calculation in equation (1) to generate the modified histogram values, $J_k(i, n)$. The threshold function, $T_k(i)$, can be a constant value or a function of the counter number, i. The weighting function LUT 414 receives a counter number, i, from the state machine control unit 420 (FIG. 5), and outputs a weighting function value, $W_k(i)$, corresponding to the counter number, i.

Figures 7A, 7B:
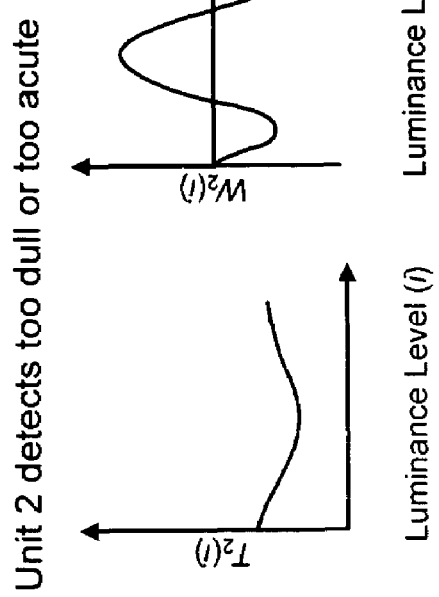
FIGS. 7A-7D illustrate exemplary threshold and weighting functions.
Figures 7C, 7D:
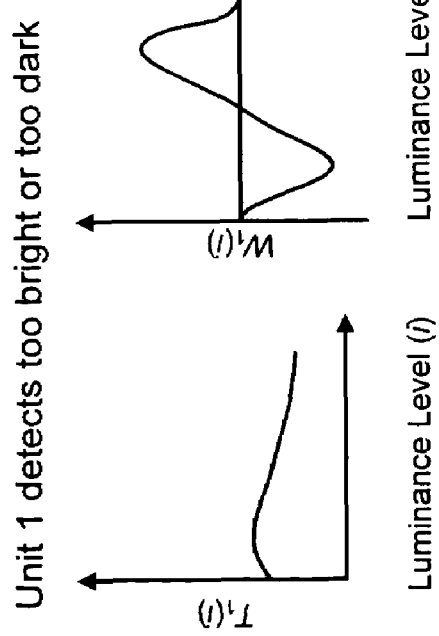

Preferably, the threshold function, $T_k(i)$, and weighting function, $W_k(i)$, are associated with a property analysis unit 410 so that the particular characteristic of the pixel luminance histogram can be identified by the corresponding analysis unit 410. For example, FIG. 7A and 7B illustrate exemplary threshold and weighting functions, respectively, that would be appropriate for a property analysis unit, e.g., unit 1 (410a), that is configured to determine whether an image is too bright or too dark. FIG. 7C and FIG. 7D illustrate exemplary functions that would be appropriate for a property analysis unit, e.g., unit 2 (410b), that is configured to determine whether an image is too dull or too acute.

Referring again to FIG. 6, the property analysis unit 410 also includes a multiplier 416 that receives the output of the threshold unit 412, which is the modified histogram value, $J_k(i, n)$, and the corresponding weighting function value, $W_k(i)$, and outputs the product to an ADD circuit 418. The ADD circuit 418 performs the summation portion of equation (2) above, and the partial summation is stored in a partial register 419. The partial register receives a clock signal and a clear signal from the state machine control unit 420 (FIG. 5). Accordingly, when all histogram values, H (i, n), have been analyzed, i.e., when i=K, the partial register 419 outputs the property parameter, P(k, n).

Figures 8A, 8B:
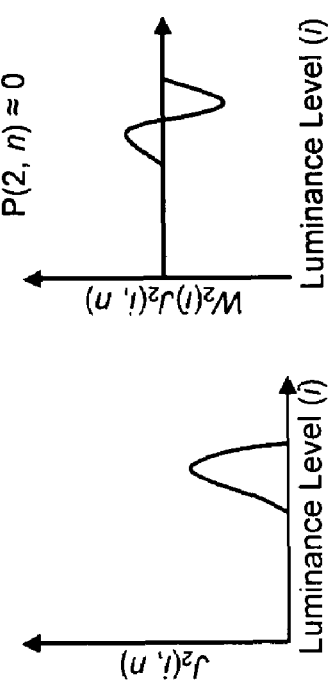
FIGS. 8A-8D illustrate exemplary intermediate luminance level curves for the calculation of property parameters.

For example, suppose the pixel luminance histogram, H(i, n), illustrated in FIG. 3A is analyzed by a property analysis unit 410 that is configured to determine whether an image in a frame is too bright or too dark. After the threshold function illustrated in FIG. 7A is applied to the histogram in FIG. 3A, the modified histogram, $J_1(i, n)$, is shown in FIG. 8A. After the modified histogram is multiplied by the weighting function shown in FIG. 7B, the resulting curve is illustrated in FIG. 8B. Because the curve is greater than or equal to zero (0) for all luminance levels, the property parameter, P(1, n), is also greater than zero (0), indicating that the image is too bright.

Figures 8C, 8D:
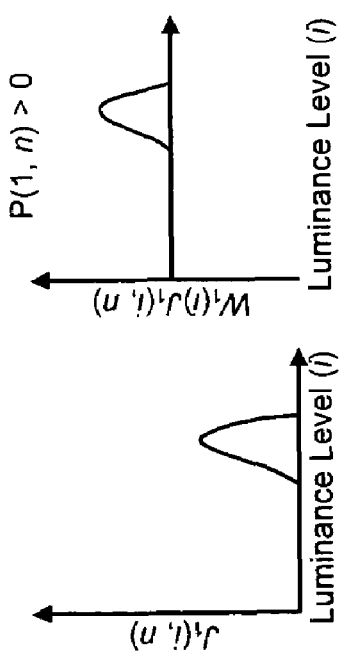

If the same pixel luminance histogram is analyzed by a property analysis unit 410 that is configured to determine whether an image in a frame is too dull or acute, the threshold function illustrated in FIG. 7C is applied to the histogram in FIG. 3A, and the modified histogram, $J_2(i, n)$, is shown in FIG. 8C. After the modified histogram is multiplied by the weighting function shown in FIG. 7D, the resulting curve is illustrated in FIG. 8D. Here, approximately half of the curve is less than zero (0) and half of the curve is greater than zero (0). Thus, the property parameter, P(2, n), is approximately zero, indicating that the image is neither too dull nor too acute.

Referring again to FIG. 2, after the property parameters, P(k, n), have been calculated, the brightness and contrast adjustment unit 500 uses the property parameters that characterize the brightness/contrast properties of the image in the frame, i.e., frame n, to determine at least one family of nonlinear adjustment curves (step 206). According to a preferred embodiment of the present invention, the determined nonlinear adjustment curve(s) can then be used to adjust and correct the brightness and contrast of the image in a next frame, i.e., frame n+1. Thus, the adjustment unit 500 receives pixel luminance data for a next frame (step 208) and automatically adjusts the incoming pixel luminance data by applying the determined nonlinear adjustment curve(s) to the pixel data (step 210).

Figure 9:
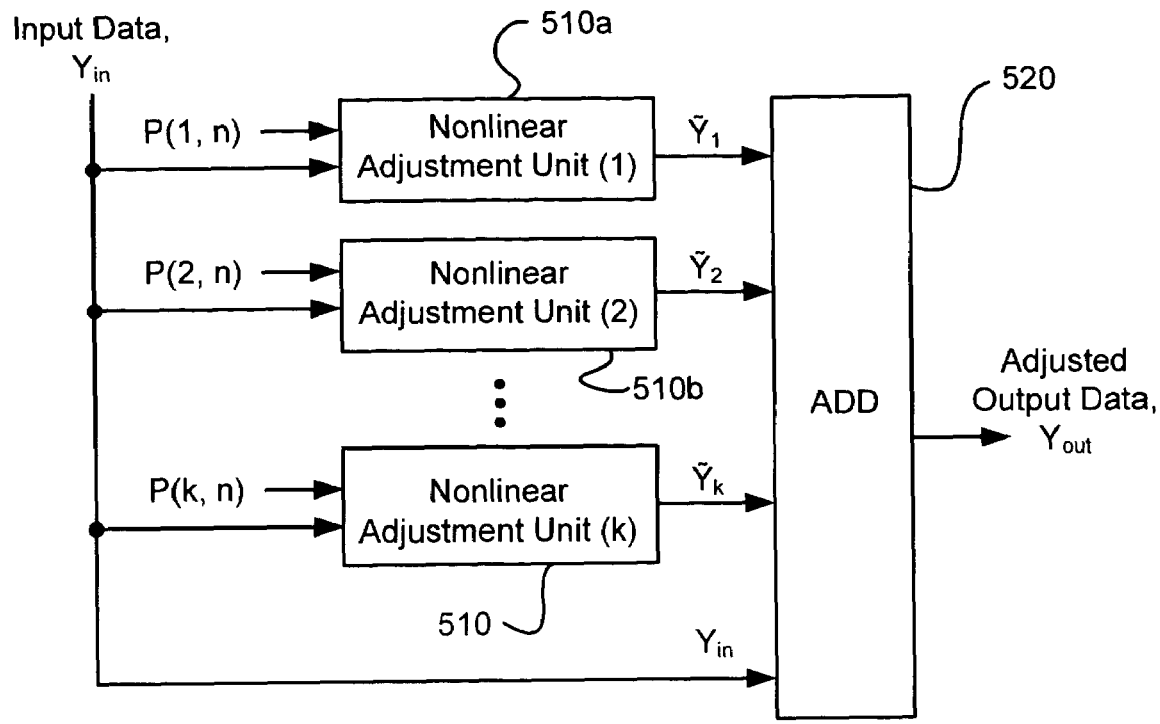
FIG. 9 is a block diagram of the brightness and contrast adjustment unit according to a version of the present invention.

FIG. 9 is a block diagram of the brightness and contrast adjustment unit 500 according to a version of the present invention. The adjustment unit 500 includes a plurality of nonlinear adjustment units 510. Each nonlinear adjustment unit 510 is associated with a property analysis unit 410 (FIG. 5), and in turn to the associated property parameter, P(k, n). For example, nonlinear adjustment unit 1 (510a) corresponds to property analysis unit 1 (410a) and to the property parameter, P(1, n).

According to a version of the present invention, each nonlinear adjustment unit 510 is configured to apply a particular family of nonlinear adjustment curves to correct a particular brightness/contrast property of an image in a frame. For example, if the property analysis unit 1 (410a) detects that the image in the frame is too bright, i.e., P(1, n)>0, nonlinear adjustment unit 1 (510a) can adjust the brightness of the image in the next frame by applying its nonlinear adjustment curve appropriate for adjusting brightness. If the image is not too bright or dark, i.e., P(1, n)=0, nonlinear adjustment unit 1 (510a) will not perform any adjustment.

Figure 10:
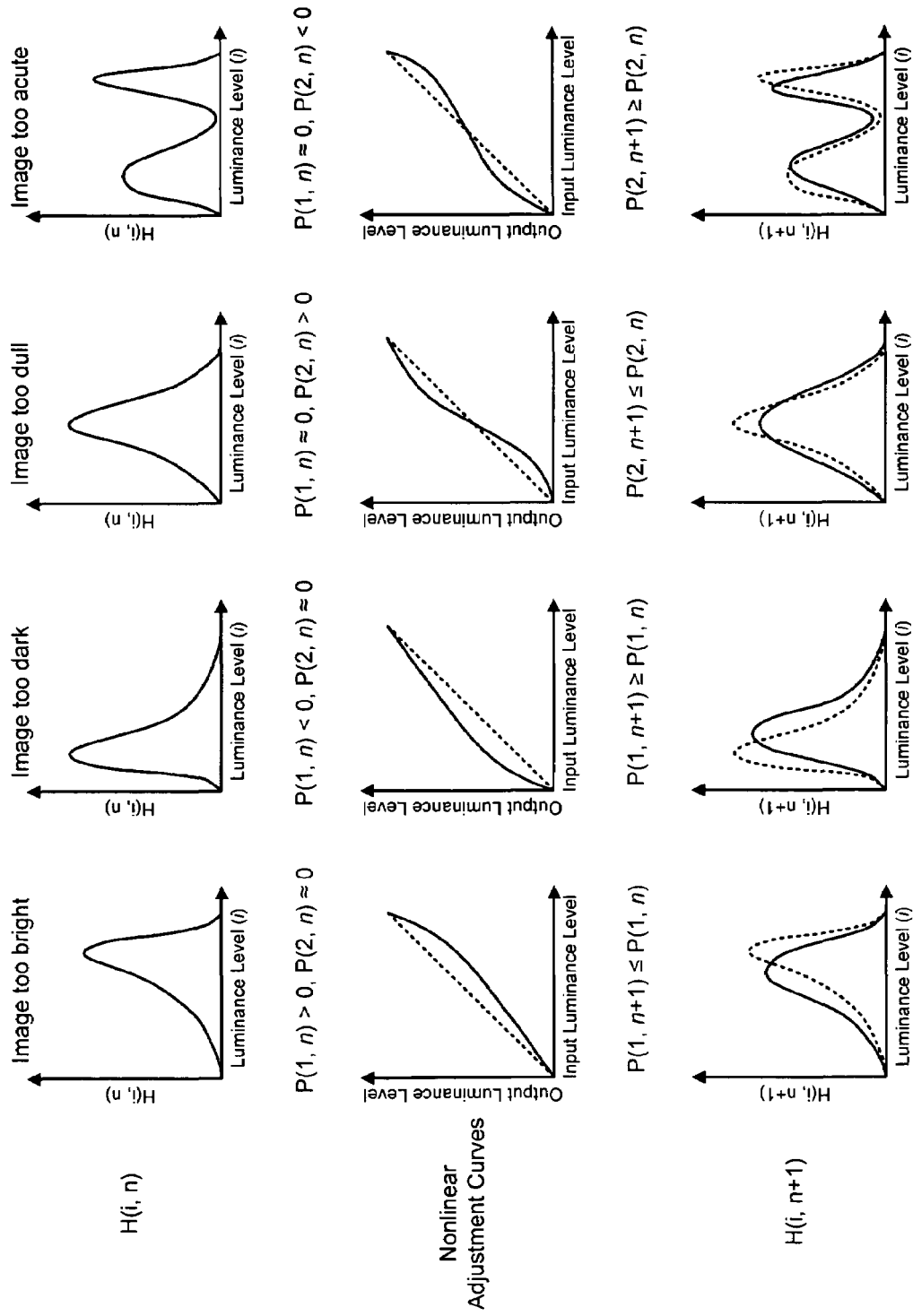
FIG. 10 illustrates several exemplary nonlinear adjustment curves corresponding to certain brightness/contrast properties.

FIG. 10 illustrates several exemplary nonlinear adjustment curves corresponding to certain brightness/contrast properties, such as too bright/dark and too dull/acute. As is shown, when a nonlinear adjustment curve is applied to the input pixel luminance data in the next frame, the luminance level distribution and the resulting pixel luminance histogram corresponding to the next frame are shifted. In particular, the dominant luminance value(s) is stretched to enhance the contrast of the dominant luminance value. This shift reflects the automatic adjustment in brightness and/or contrast performed by the appropriate nonlinear adjustment unit 510.

As is shown, each nonlinear adjustment unit 510 receives its associated property parameter, P(k, n), along with the pixel luminance data, $Y_{in}$, of the next frame. Each nonlinear adjustment unit 510 will adjust the luminance data of the next frame, i.e., frame n+1, depending on the value of the corresponding property parameter, P(k, n), derived from the preceding frame, i.e., frame n.

Figure 11:
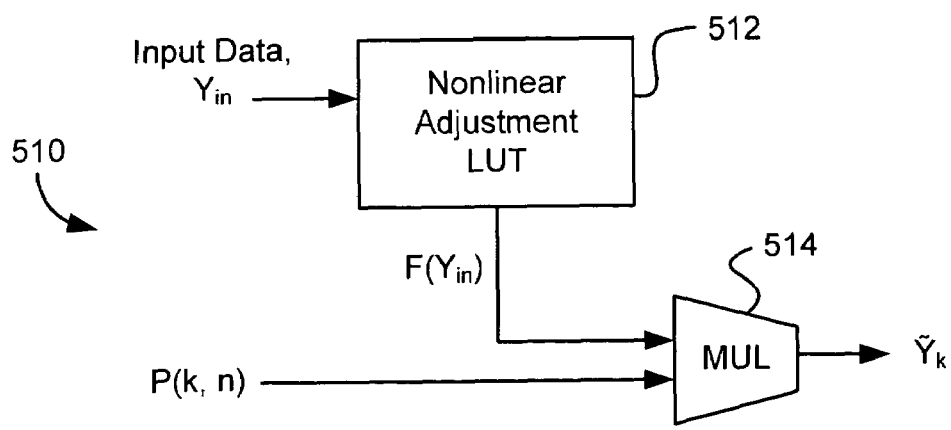
FIG. 11 is a block diagram of a nonlinear adjustment unit according to a version of the present invention.

FIG. 11 is a block diagram of the nonlinear adjustment unit 510 according to a version of the present invention. The nonlinear adjustment unit 510 includes a nonlinear adjustment LUT 512 that applies the associated nonlinear adjustment curve to the input luminance data value, $Y_{in}$, and outputs an adjustment curve value, $F(Y_{in})$, that is multiplied by the property parameter, P(k, n). A luminance adjustment value, $\tilde{Y}_k$, is outputted. Note that if the property parameter is approximately zero (0), indicating that the image does not exhibit the corresponding brightness/contrast property, the luminance adjustment value, $\tilde{Y}_k$, will also be approximately zero (0). Thus, in effect, the family of nonlinear adjustment curves associated with the nonlinear adjustment unit 510 are not applied to the input luminance data value.

Referring again to FIG. 9, each nonlinear adjustment unit 510 generates its luminance adjustment value, $\tilde{Y}_k$, which is provided to an ADD circuit 520. The ADD circuit 520 adds the luminance adjustment values, $\tilde{Y}_k$, to the input pixel luminance data value, $Y_{in}$, to generate the adjusted output data value, $Y_{out}$.

Referring again to FIG. 2, after the pixel luminance data of the next frame has been adjusted according to the relevant nonlinear adjustment curve(s) (step 210), the adjusted output luminance data, $Y_{out}$, is outputted to a display 200 (step 212) and also received by the histogram generation unit 300 so that a pixel data histogram can be generated for the next frame (step 214). The histogram for the next frame is received by the histogram characterization unit 400 and steps 204 to 214 are repeated. In this manner, the module 100 forms a feedback loop that allows for responsive and adaptive brightness and contrast adjustment of the incoming video signal.

According to a version of the present invention, the dynamic range of the displayed image can be automatically adjusted and enhanced in real-time. The image brightness and contrast management module 100, according to the present invention, examines the input video signal frame-by-frame to assess, in real-time, the pixel luminance histogram of the input video signal at every frame. From the histogram, the image's dynamic range, dominant luminance levels, and the optimal contrast level can be determined. By nonlinearly adjusting the pixel luminance level distribution, bright or dark dominant areas are stretched to a higher luminance level distribution range to enhance the contrast of the dominant components of the image without blackening the darker parts or saturating the brighter parts of the image.

Figure 12:
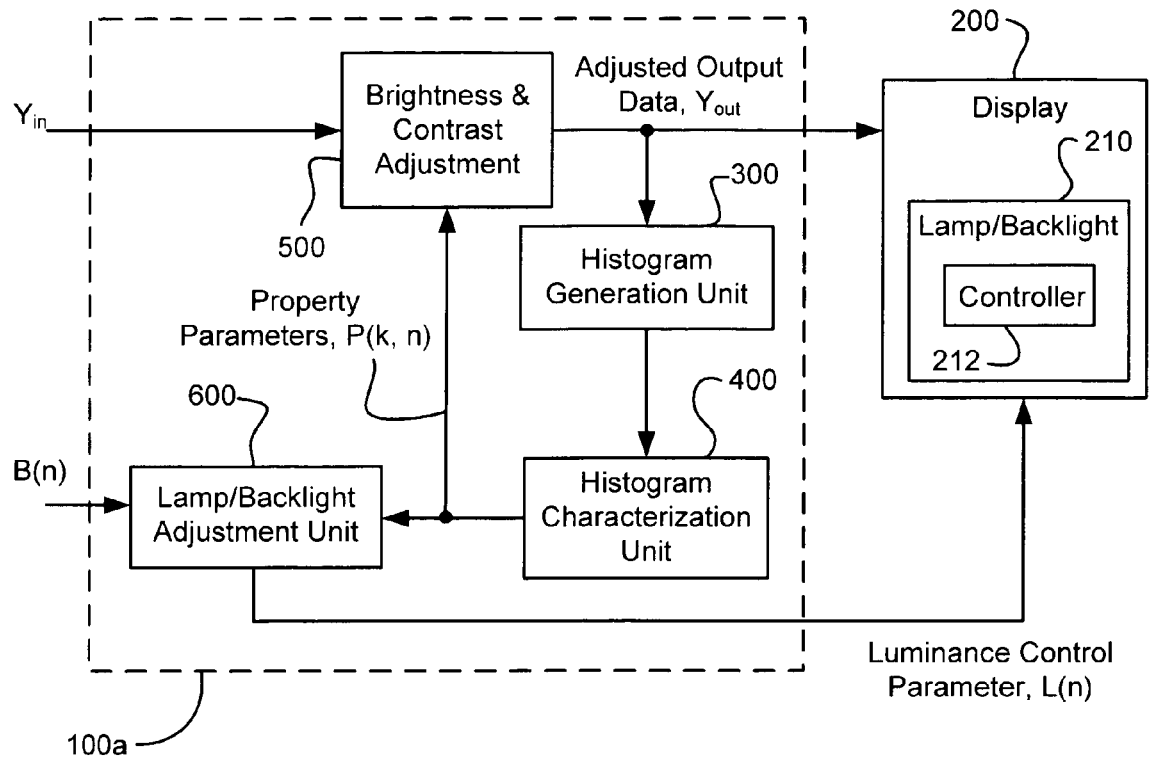
FIG. 12 is a block diagram of an image brightness and contrast management module according to another version of the present invention.

According to another version of the present invention, illustrated in FIG. 12, the image brightness and contrast management module 100a includes a lamp/backlight adjustment unit 600. In this version, the lamp/backlight adjustment unit 600 can be utilized for a system that includes a display device 200 that employs a projector lamp or panel backlight 210 to display the video signal. Such a system can be, for example, a DMD, LCD, or LCOS projector with a lamp, or an LCD panel with a backlight. The absolute overall brightness of the displayed image is determined by the projector lamp or panel backlight intensity, which is set by a controller 212. The relative brightness distribution of the displayed image is determined by the pixel luminance data, $Y_{out}$, received by the display 200.

In a preferred embodiment of the present invention, the lamp/backlight adjustment unit 600 is configured to control the intensity of the lamp/backlight 210 based on the property parameters, P(k, n), and/or on ambient light conditions. In one version, the display system includes an ambient light detector (not shown) coupled to the lamp/backlight adjustment unit 600. The detector measures an ambient light level, B(n), and provides it to the lamp/backlight adjustment unit 600. The lamp/backlight adjustment unit 600 analyzes the property parameters for the frame, P(k, n) and the ambient light level, B(n) to calculate a display luminance control parameter, L(n). The display luminance control parameter, L(n), is received by the controller 212, which adjusts the lamp/backlight intensity accordingly.

Figure 13:
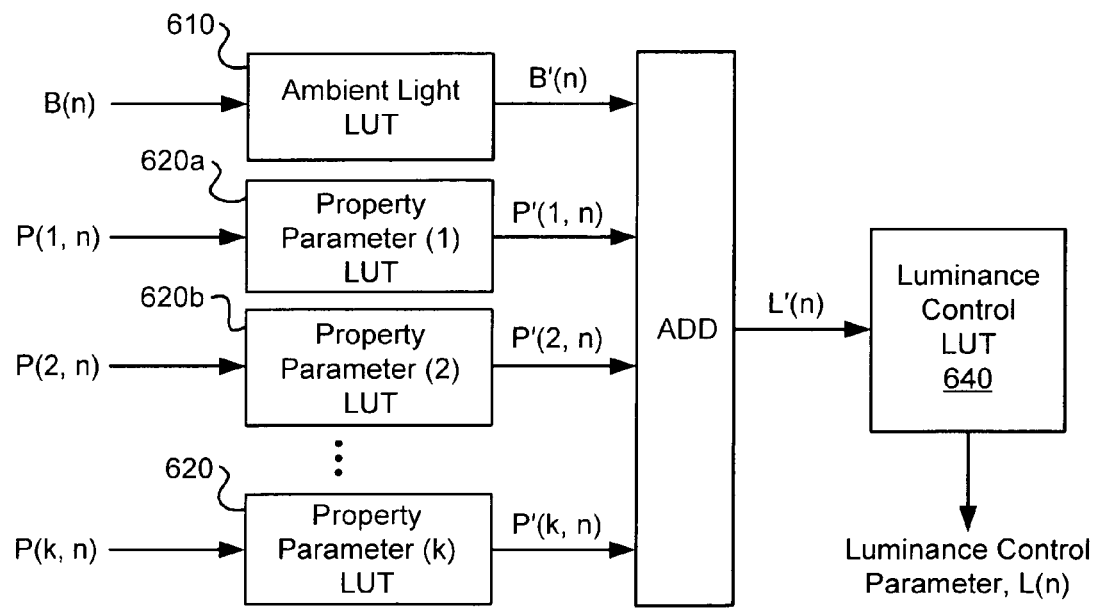
FIG. 13 is a block diagram of the lamp/backlight adjustment unit according to a version of the present invention.

FIG. 13 is a block diagram of the lamp/backlight adjustment unit 600 according to one version of the present invention. The lamp/backlight adjustment unit 600 includes an ambient light LUT 610, a plurality of property parameter LUTs 620, and a luminance control LUT 640. The measured ambient light level, B(n), is used to perform a lookup in the ambient light LUT 610 to determine an ambient light intensity parameter, B'(n), corresponding to the measured ambient light level, B(n). In a preferred embodiment, the ambient light intensity parameter, B'(n), is related to how the intensity of the lamp/backlight 210 should be adjusted to take into account the ambient light conditions.

Each property parameter LUT 620 is associated with a property parameter, P(k, n). The property parameter LUT 620 correlates the associated property parameter, P(k, n) with a luminance data intensity parameter, P'(k, n), which is related to the how the intensity for the lamp/backlight 210 should be adjusted to take into account the brightness/contrast property represented by the property parameter, P(k, n). All of the luminance data intensity parameters, P'(k, n), and the ambient light intensity parameter, B'(n), are added to produce a sum, L'(n). The sum, L'(n) is used to perform a lookup in the luminance control LUT 640 to determine the luminance control parameter, L(n). As stated above, the luminance control parameter, L(n), is received by the lamp/backlight controller 212 (FIG. 12), which adjusts the lamp/backlight intensity accordingly.

Thus, according to this version of the present invention, the property parameters, P(k, n), describing the brightness/contrast characteristics of the input image can be used to adjust the pixel luminance level distribution and, in combination with the brightness of the ambient light, to control the lamp/backlight intensity. The image brightness and contrast management module 100a maximizes the bright and dark contrast of the input image that results in an optimal dynamic range, which represents the real contrast that the viewer perceives while watching moving images.

According to this version of the present invention, when the ambient light is brighter, the projector lamp or panel backlight intensity can be increased, i.e., set to brighter. When the ambient light becomes darker, the projector lamp or panel backlight intensity can be smoothly reduced to accommodate the lower ambient light conditions. This results in exceptionally dark blacks for dark ambient illumination while still enabling very bright images for bright ambient illumination.

Similarly, when the video content is generally bright, the projector lamp or panel backlight intensity can be set to full brightness. When the video content becomes largely dark, the projector lamp or panel backlight intensity can be smoothly reduced, while the luminance level distribution of the pixel data in the dark dominant areas of the input image can be simultaneously stretched. This results in exceptionally dark blacks for dark scenes in a low ambient light, i.e., dark room, environment while still enabling very bright images for bright scenes. Thus, images that have a narrow dynamic range, i.e., low contrast ratio, can be adjusted so that a larger number of gray levels of the display can be utilized.

Those skilled in the art would readily recognize that the version described above can also be implemented without an ambient light detector or without regard to the property parameters. In other words, the adjustments to the lamp/backlight intensity can be based solely on the luminance data of the displayed images via the property parameters, $P(k, n)$ or alternatively on the measured ambient light level. Because the intensity of the lamp/backlight is controlled, overall power consumption is lowered, thereby saving energy and reducing the heat generated by the projector lamp or panel backlight.

Figure 14:
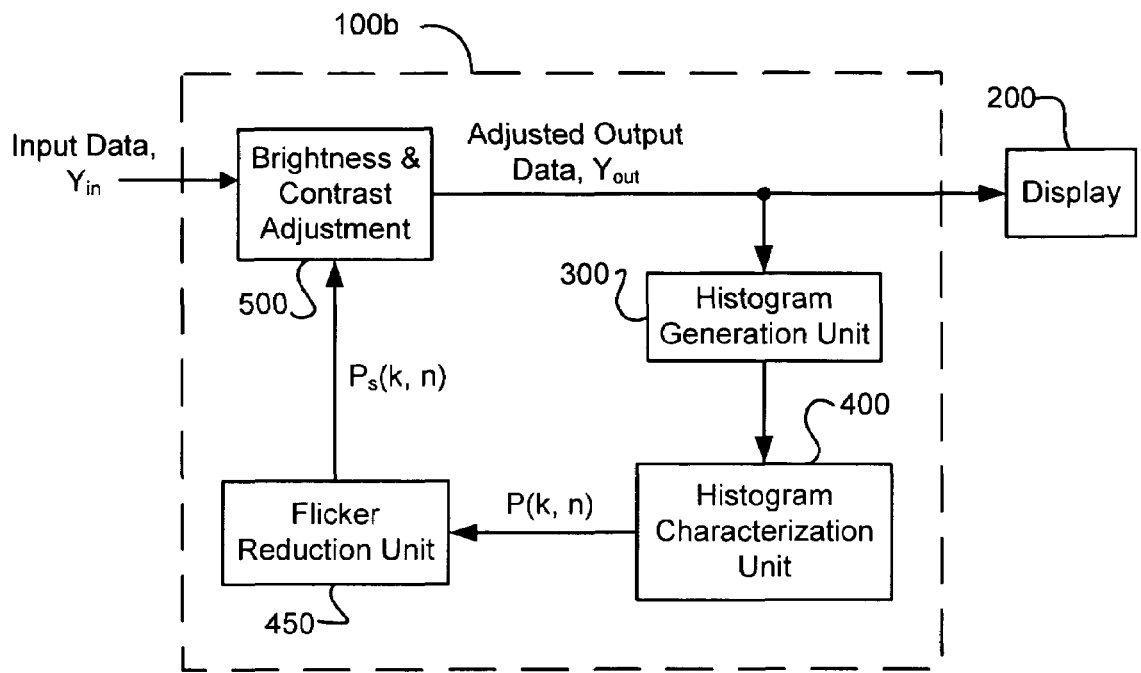
FIG. 14 is a block diagram of an image brightness and contrast management module according to another version of the present invention.

According to another version of the present invention, illustrated in FIG. 14, the image brightness and contrast management module 100b includes a flicker reduction unit 450 between the histogram characterization unit 400 and the brightness and contrast adjustment unit 500. The flicker reduction unit 450 reduces perceived image flickering due to relatively large fluctuations in brightness/contrast characteristics of displayed images during a time period. The flicker reduction unit 450 receives the property parameter, $P(k, n)$, and controls the degree to which the property parameters, $P(k, n)$, can change during a particular time period (i.e., from frame to frame). The unit 450 outputs a pixel data adjustment parameter, $P_s(k, n)$.

Figure 15:
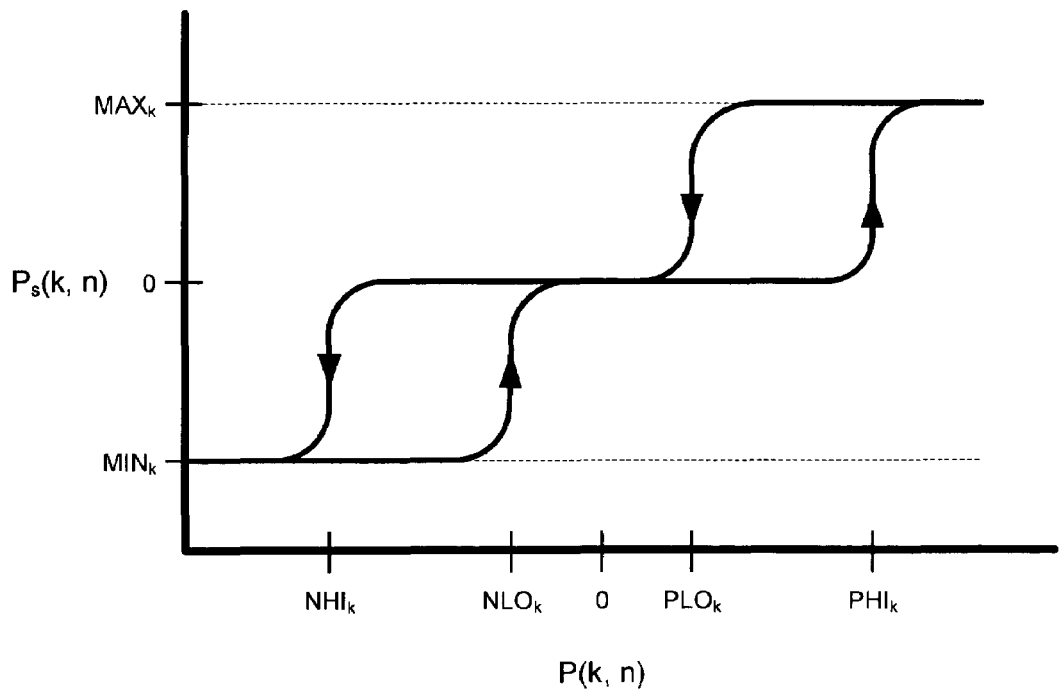
FIG. 15 illustrates an exemplary hysteresis curve that shows the behavioral aspects of the flicker reduction unit.

The flicker reduction unit 450 according to the present invention utilizes a temporal smoothing state machine with hysteresis within adjustment thresholds to suppress unexpected changes in brightness, thereby eliminating or reducing image flickering. FIG. 15 illustrates an exemplary hysteresis curve that shows the behavioral aspects of the flicker reduction unit 450. As is shown, if $P(k, n)$ increases from a negative value below a negative-low threshold value $NLO_k$ to zero (0), the pixel data adjustment parameter, $P_s(k, n)$, increases from a negative value to zero (0) at the negative-low threshold value $NLO_k$. If $P(k, n+1)$ then decreases immediately from zero (0) to a negative value less than the negative-low threshold value $NLO_k$, the pixel data adjustment parameter, $P_s(k, n+1)$, will not follow suit unless $P(k, n+1)$ decreases to a value below a negative-high threshold value $NHI_k$. Thus, $P(k, n)$ can fluctuate between zero (0) and the $NHI_k$ threshold value, while the pixel data adjustment parameter, $P_s(k, n)$, remains constant. Similar behavior will occur if $P(k, n)$ increases from zero (0) to a positive value above a positive-low threshold value $PLO_k$ or a positive-high threshold value $PHI_k$, as can be seen from the hysteresis curve illustrated in FIG. 15.

According to a version of the present invention, the following table summarizes the decision process in the flicker reduction unit 450.

TABLE 1

| Inputs | | Output |
|---|---|---|
| $P(k, n) \leq NHI_k$ | $P_s(k, n - 1) < 0$ | $P_s(k, n) = \max[P_s(k, n - 1) - AU_k, MIN_k]$ |
| | $P_s(k, n - 1) = 0$ | $P_s(k, n) = P_s(k, n - 1) - AU_k$ |
| | $P_s(k, n - 1) > 0$ | $P_s(k, n) = P_s(k, n - 1) - AD_k$ |
| $NHI_k < P(k, n) \leq NLO_k$ | $P_s(k, n - 1) < 0$ | $P_s(k, n) = P_s(k, n - 1)$ |
| | $P_s(k, n - 1) = 0$ | $P_s(k, n) = P_s(k, n - 1)$ |
| | $P_s(k, n - 1) > 0$ | $P_s(k, n) = P_s(k, n - 1) - AD_k$ |
| $NLO_k < P(k, n) < PLO_k$ | $P_s(k, n - 1) < 0$ | $P_s(k, n) = P_s(k, n - 1) + AD_k$ |
| | $P_s(k, n - 1) = 0$ | $P_s(k, n) = P_s(k, n - 1)$ |
| | $P_s(k, n - 1) > 0$ | $P_s(k, n) = P_s(k, n - 1) - AD_k$ |
| $PLO_k \leq P(k, n) < PHI_k$ | $P_s(k, n - 1) < 0$ | $P_s(k, n) = P_s(k, n - 1) + AD_k$ |
| | $P_s(k, n - 1) = 0$ | $P_s(k, n) = P_s(k, n - 1)$ |
| | $P_s(k, n - 1) > 0$ | $P_s(k, n) = P_s(k, n - 1)$ |
| $PHI_k \leq P(k, n)$ | $P_s(k, n - 1) < 0$ | $P_s(k, n) = P_s(k, n - 1) + AD_k$ |
| | $P_s(k, n - 1) = 0$ | $P_s(k, n) = P_s(k, n - 1) + AU_k$ |
| | $P_s(k, n - 1) > 0$ | $P_s(k, n) = \min[P_s(k, n - 1) + AU_k, MAX_k]$ |

$NHI_k$, $NLO_k$, $PLO_k$, and $PHI_k$ are the negative-high, negative-low, positive-low, and positive-high decision levels for the $k^{th}$ property parameter $P(k, n)$, respectively, where $NHI_k \leq NLO_k \leq 0 \leq PLO_k \leq PHI_k$. $AU_k > 0$ and $AD_k > 0$ are the upward and downward adjustment steps for the $k^{th}$ pixel data adjustment parameter $P_s(k, n)$, respectively. The values of $AU_k$ and $AD_k$ control the upward, i.e., toward $MIN_k$ or $MAX_k$, and downward, i.e., toward zero (0), transition rates for the $k^{th}$ pixel data adjustment parameter $P_s(k, n)$, respectively. $MIN_k < 0$ and $MAX_k > 0$ are the minimum allowable negative value and maximum allowable positive value for the $k^{th}$ pixel data adjustment parameter $P_s(k, n)$, respectively.

Figure 16:
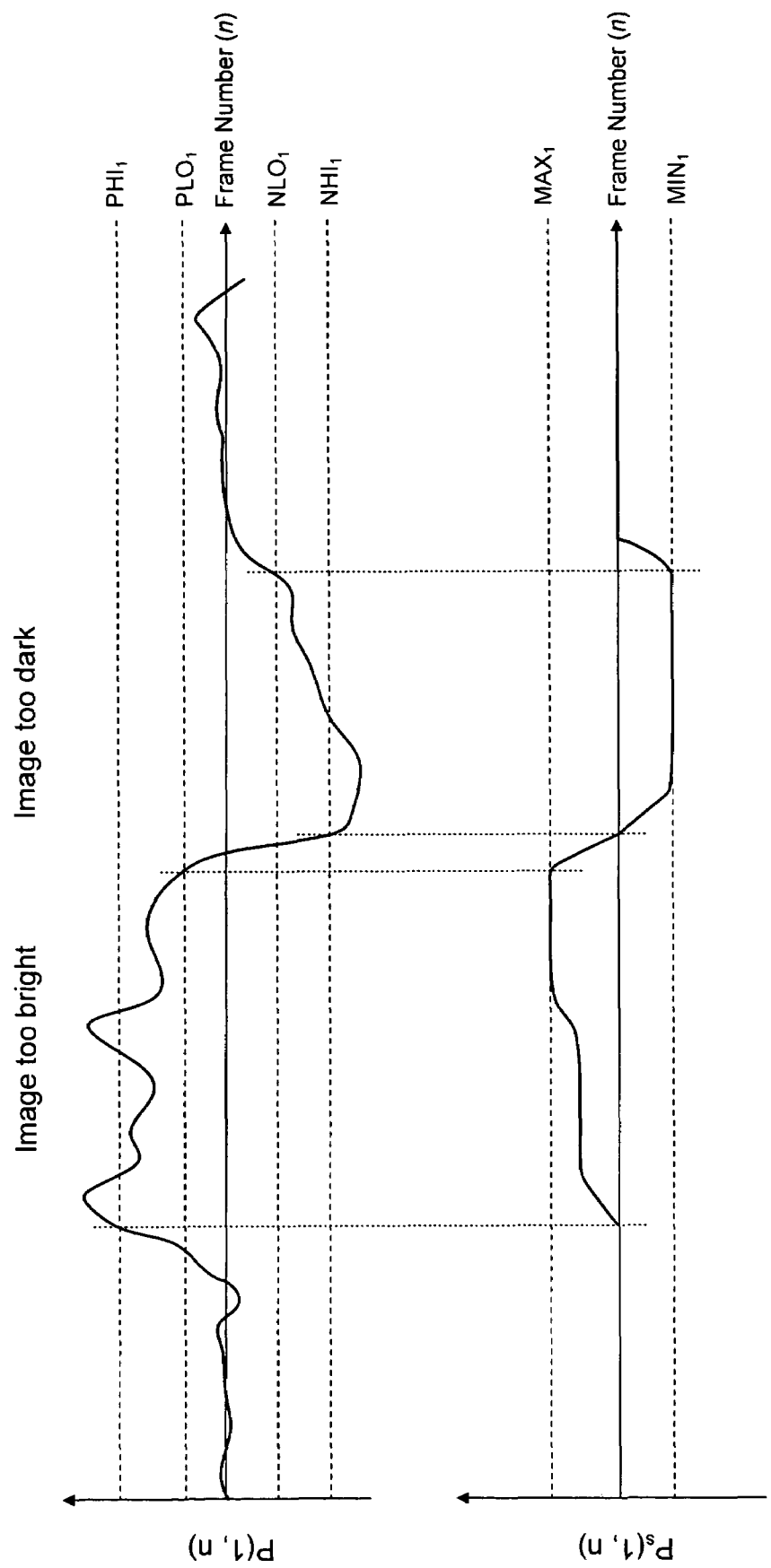
FIG. 16 is a temporal graph of property parameter values and the pixel data adjustment parameter values against frame number.

FIG. 16 illustrates how the flicker reduction unit 450 controls the pixel data adjustment parameter, $P_s(k, n)$, over time for a series of video frames exhibiting an exemplary property parameter fluctuation. In the example illustrated in FIG. 16, property parameter value, $P(1, n)$ are generated by a property analysis unit 410a that detects whether an image is too bright/dark. As is shown, the temporal behavior of the corresponding pixel data adjustment parameter, $P_s(1, n)$, fluctuates less than the property parameter, $P(1, n)$. In addition, transitions between high, intermediate, and low values are smooth, because the rates of the transitions are limited by the flicker reduction unit 450. Because the temporal behavior of the pixel data adjustment parameter, $P_s(k, n)$, is smoothened, the flickering effect in the displayed images is significantly reduced.

Figure 17:
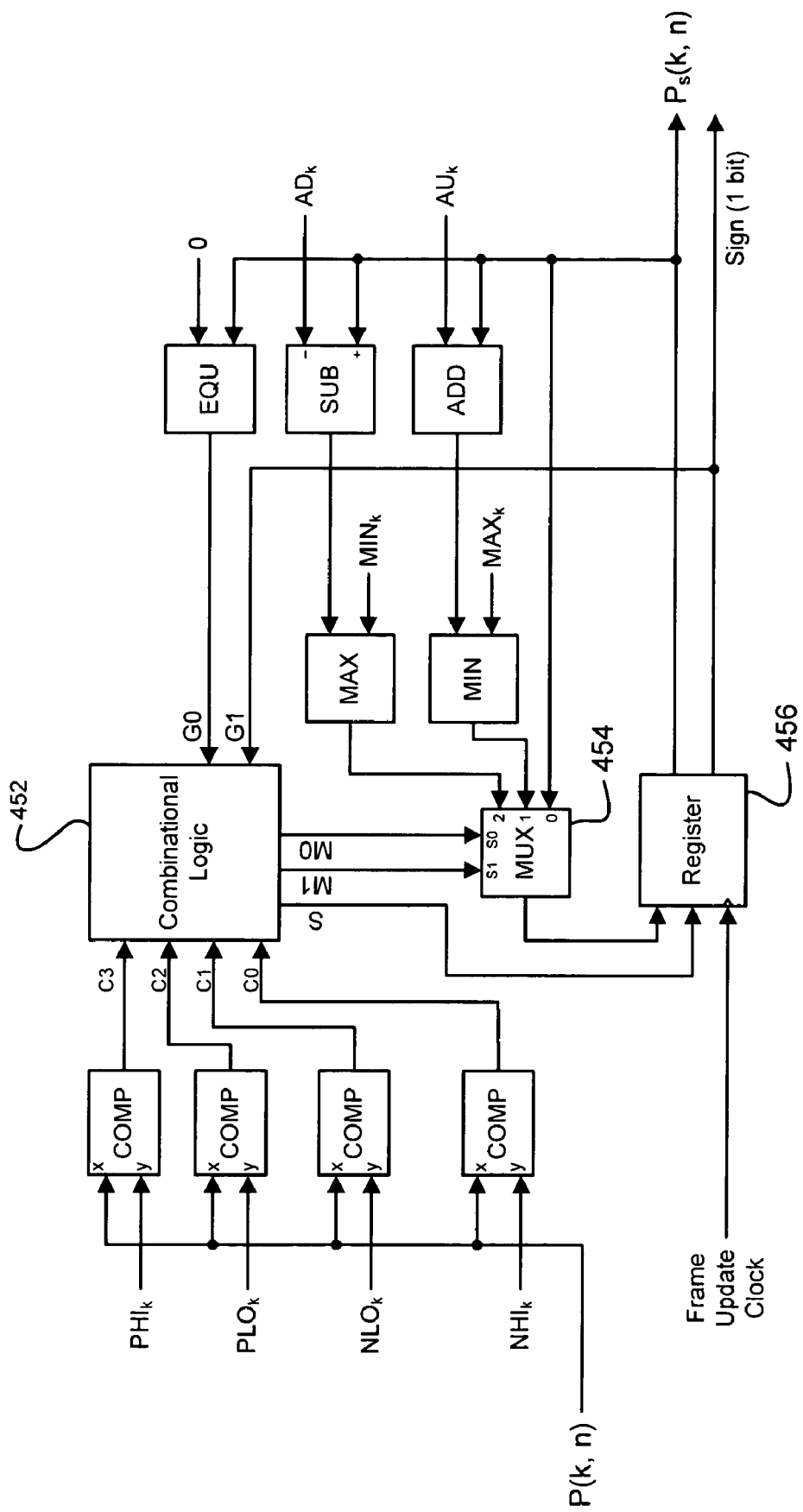
FIG. 17 is an exemplary circuit diagram of the flicker reduction unit according to a version of the present invention.

FIG. 17 is an exemplary circuit diagram of the flicker reduction unit 450 according to a version of the present invention. The circuit illustrated corresponds to a particular property parameter, $P(k, n)$, and therefore, the flicker reduction unit 450 can include several of the circuits illustrated in FIG. 17, each one handling a particular property parameter. As is shown, the property parameter $P(k, n)$ is received and compared to the various threshold values. The results of the comparisons are inputted into a combinational logic block 452, which also receives inputs relating to the pixel data adjustment parameter $P_s(k, n-1)$ of the previous frame. The output of the combinational logic 452 is provided to a multiplexer 454, which also receives possible values for the pixel data adjustment parameter $P_s(k, n)$ of the current frame. Based on the property parameter P(k, n) and pixel data adjustment parameter $P_s$(k, n−1) of the previous frame, the appropriate pixel data adjustment parameter $P_s$(k, n) of the current frame is selected. The pixel data adjustment parameter $P_s$(k, n) is provided to a register 456, which also receives a frame update clock signal applied to the state machine control unit 420 (FIG. 5). The register 456 outputs the selected pixel data adjustment parameter $P_s$(k, n), where it is used for the next frame and also provided to the brightness and contrast adjustment unit 500 (FIG. 14).

The image brightness and contrast management module 100 can be incorporated into any display system that performs image signal processing, such as an image capture device, printer, or television display system. For example, the management module 100 can be coupled to a de-interlacer in a television display system, where the de-interlacer converts an interlaced video signal into a progressive scanned video signal which is displayed to a viewer.

Figure 18:
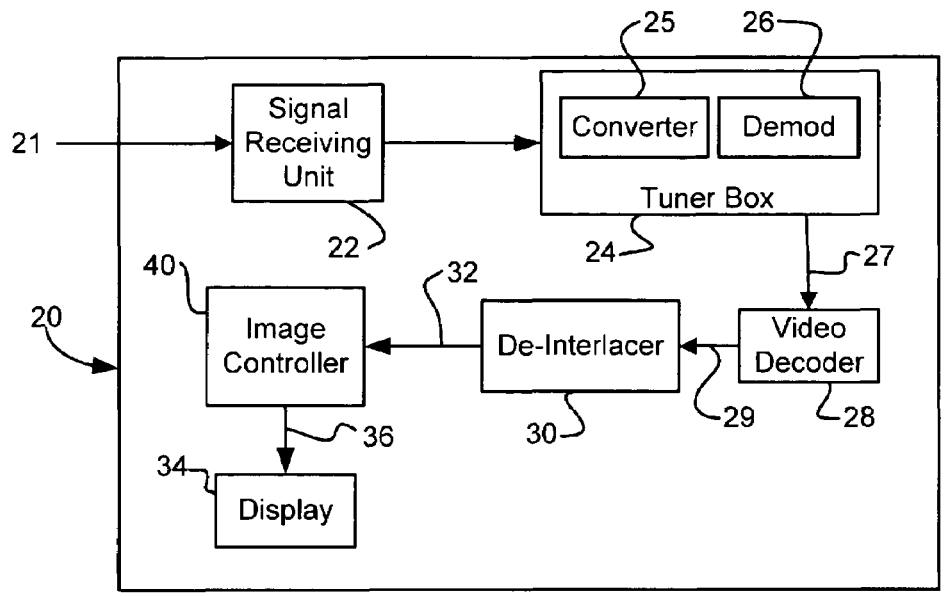
FIG. 18 depicts an exemplary display system according to a version of the present invention.

FIG. 18 depicts an exemplary display system according to a version of the present invention. As is shown the display system 20 includes a signal receiving unit 22 that is coupled to a tuner box 24, and a video decoder 28. Signals 21, such as television signals, are captured by the signal receiving unit 22 and transmitted to the tuner box 24. The tuner box 24 includes a converter 25 and a demodulation unit 26 that transforms the incoming signal 21 into an analog signal 27. The analog signal 27 is received by the video decoder 28, which outputs an interlaced video signal 29. The de-interlacer 30 converts the interlaced video signal 29 into a progressive video output signal 32. The progressive video output signal 32 is then received by an image controller 40 that performs automatic and manual adjustments to the pixel data. The adjusted progressive video signal 36 is then displayed via a display device 34, such as an LCD or a PDP. In a preferred embodiment, the de-interlacer 30 is that described in co-pending U.S. application Ser. No. 11/019,017, filed Dec. 20, 2004 and entitled "METHOD AND APPARATUS FOR PER-PIXEL MOTION ADAPTIVE DE-INTERLACING OF INTERLACED VIDEO FIELDS," the entirety of which is herein incorporated by reference.

Figure 19:
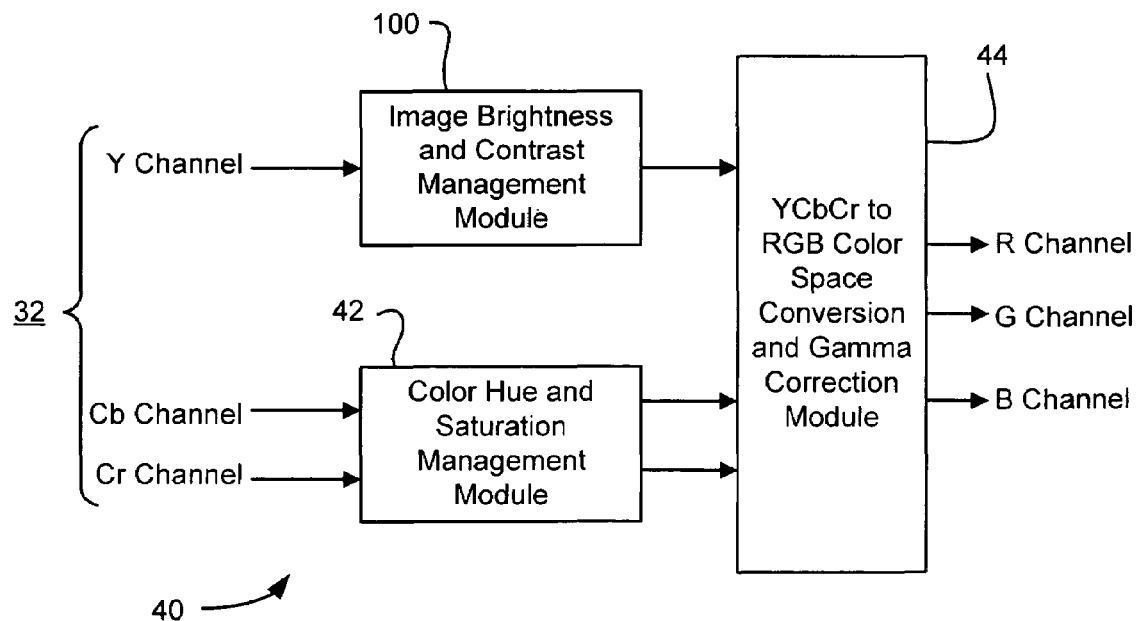
FIG. 19 is a block diagram of an exemplary image controller according to a version of the present invention.

FIG. 19 is a block diagram of an exemplary image controller 40 according to a version of the present invention. The image controller 40 can include the image brightness and contrast management module 100 according to the present invention and a color hue and saturation management module 42, such as the one described in co-pending U.S. application Ser. No. 11/112,816, filed Apr. 21, 2005 and entitled "METHOD AND SYSTEM FOR AUTOMATIC COLOR HUE AND COLOR SATURATION ADJUSTMENT OF A PIXEL FROM A VIDEO SOURCE," the entirety of which is herein incorporated by reference. Both modules 100, 42 can automatically adjust the pixel data in the YCbCr color space and then provide the adjusted pixel data to a conventional YCbCr to RGB color space conversion and gamma correction module 44. In another version, the image controller 40 can either receive the pixel data from the video decoder 28 via the interlaced video signal 29, or from the de-interlacer 30 via the progressive video output signal 32.

Versions of the present invention provide a system that automatically improves the brightness and contrast of the displayed images in real-time to achieve improved image quality and to provide a better viewing experience without the need for manual adjustment. In a preferred embodiment, the brightness/contrast property parameters of the input video signal and the measured ambient light level determine the degree to which the luminance level distribution of pixel data from the input video signal and the intensity of the projector lamp or panel backlight of the display system will be adjusted.

The present invention has been described with reference to certain preferred versions. Nevertheless, other versions are possible. For example, the number and types of lookup tables can vary. Further, alternative steps equivalent to those described for the brightness/contrast adjustment process can also be used in accordance with the parameters of the described implementations, as would be apparent to one of ordinary skill. Therefore, the spirit and scope of the appended claims should not be limited to the description of the preferred versions contained herein.

What is claimed is:

1. An image brightness and contrast management module for automatically adjusting brightness and contrast of an input video signal, the module comprising:
   a histogram generation unit for generating, on a frame-by-frame basis, a pixel luminance histogram based on a luminance value of each of a plurality of pixels in a frame, wherein the histogram comprises a distribution of luminance values in the frame, the distribution indicating a dynamic range and at least one dominant luminance value for the frame;
   a histogram characterization unit for analyzing the pixel luminance histogram for the frame and for identifying which of a plurality of brightness/contrast properties is exhibited in the frame; and
   a brightness and contrast adjustment unit for nonlinearly adjusting in real-time the luminance values of the plurality of pixels in a next frame based on the identified brightness/contrast properties exhibited in a preceding frame,
   such that bright or dark dominant areas of an image in the next frame are stretched to enhance the contrast of the dominant luminance values of the next frame without blackening the darker portions or saturating the brighter portions of the image.

2. The module of claim 1 wherein the histogram characterization unit includes at least one property analysis unit, wherein each property analysis unit is configured to analyze the pixel luminance histogram for the frame and to identify a particular brightness/contrast property based on the histogram.

3. The module of claim 2 wherein each property analysis unit calculates a property parameter indicating whether the frame exhibits the particular brightness/contrast property associated with the property analysis unit.

4. The module of claim 2 wherein the brightness and contrast adjustment unit includes a nonlinear adjustment unit associated with each property analysis unit, wherein the nonlinear adjustment unit is configured to correct the particular brightness/contrast property identified by the associated property analysis unit.

5. The module of claim 4 wherein each nonlinear adjustment unit calculates a luminance adjustment value, and the brightness and contrast adjustment unit sums each luminance adjustment value, adjusts the pixel luminance values of the pixels in the next frame according to the summed luminance adjustment values, and outputs the adjusted pixel luminance values to a display device.

6. The module of claim 5 wherein the histogram generation unit receives the outputted adjusted pixel luminance values for the next frame and generates a pixel luminance histogram based on the adjusted pixel luminance values of the next frame.

7. A video display system according to claim 1 wherein the brightness and contrast adjustment unit outputs the adjusted luminance values to a display device having a projector lamp or panel backlight coupled to a controller that controls the intensity of the projector lamp or panel backlight, and wherein the module further includes:

a lamp/backlight adjustment unit for controlling the intensity of the projector lamp or panel backlight based on either or both of the pixel luminance values of a frame and a measured ambient light level.

8. The module according to claim 1 further including a flicker reduction unit that comprises a temporal smoothing state machine with hysteresis within adjustment thresholds, wherein the flicker reduction unit suppresses unexpected changes in brightness to reduce image flickering.

9. A method for automatically adjusting brightness and contrast of an input video signal, the method comprising:

receiving pixel luminance values for each of a plurality of pixels in a frame;

generating, on a frame-by-frame basis, a pixel luminance histogram based on the pixel luminance values in the frame, wherein the histogram comprises a distribution of luminance values in the frame, the distribution indicating a dynamic range and at least one dominant luminance value for the frame;

identifying which of a plurality of brightness/contrast properties is exhibited in the frame based on the pixel luminance histogram;

receiving pixel luminance values for each of a plurality of pixels in a next frame; and nonlinearly adjusting in real-time the pixel luminance values in the next frame based on the identified brightness/contrast properties exhibited in the preceding frame, such that bright or dark dominant areas of an image in the next frame are stretched to enhance the contrast of the dominant luminance values of the next frame without blackening the darker portions or saturating the brighter portions of the image in the next frame.

10. The method according to claim 9 wherein identifying which of a plurality of brightness/contrast properties is exhibited in the frame includes:

for each brightness/contrast property, applying a weighting function to the pixel luminance histogram by performing a lookup in a weighting function lookup table associated with the brightness/contrast property, and applying a threshold function associated with the brightness/contrast property.

11. The method according to claim 10 wherein identifying which of a plurality of brightness/contrast properties is exhibited in the frame further includes:

for each brightness/contrast property, calculating a property parameter that indicates whether the frame exhibits the brightness/contrast property.

12. The method according to claim 9 wherein nonlinearly adjusting the pixel luminance values in the next frame includes:

for each identified brightness/contrast property exhibited in the frame, applying a nonlinear adjustment curve associated with the identified brightness/contrast property to the pixel luminance values for the next frame by performing a lookup in a nonlinear adjustment lookup table associated with the identified brightness/contrast property.

13. The method according to claim 12 wherein nonlinearly adjusting the pixel luminance values in the next frame further includes:

for each identified brightness/contrast property exhibited in the frame, calculating a luminance adjustment value, summing the luminance adjustment values associated with each identified brightness/contrast property, and adding the summed luminance adjustment values to the pixel luminance values in the next frame.

14. The method according to claim 9 further including:

outputting the adjusted pixel luminance values for the next frame to a display device such that the adjusted luminance values are displayed;

receiving the adjusted pixel luminance values to be displayed;

generating a pixel luminance histogram based on the adjusted pixel luminance values; and repeating the automatic brightness and contrast adjustment process for another next frame.

15. The method according to claim 9 further including:

providing a display device that receives and displays the adjusted pixel luminance values using a projector lamp or panel backlight; and controlling an intensity of the projector lamp or panel backlight based on either or both of the pixel luminance values of the frame and a measured ambient light level.

16. The method according to claim 9 further including:

utilizing a temporal smoothing state machine with hysteresis within adjustment thresholds to suppress unexpected changes in brightness, thereby reducing image flickering.

17. A progressive scan display system comprising:

a signal receiving unit;

a tuner box for transforming the signal into an analog signal;

a video decoder for transforming the analog signal into a plurality of interlaced video fields, wherein each video field comprises a plurality of pixels and each pixel is defined by a luminance value and chrominance data based on color differences;

a de-interlacing system for converting the interlaced video fields into a progressive video signal;

an image controller for adjusting the pixel data of the video signal, the image controller comprising:

an image brightness and contrast management module for automatically adjusting the luminance data of the video signal to suit a viewer's tastes, the module comprising:

a histogram generation unit for generating, on a frame-by-frame basis, a pixel luminance histogram based on a luminance value of each of a plurality of pixels in a frame, wherein the histogram comprises a distribution of luminance values in the frame, the distribution indicating a dynamic range and at least one dominant luminance value for the frame;

a histogram characterization unit for analyzing the pixel luminance histogram for the frame and for identifying which of a plurality of brightness/contrast properties is exhibited in the frame; and a brightness and contrast adjustment unit for nonlinearly adjusting in real-time the luminance values of the plurality of pixels in a next frame based on the identified brightness/contrast properties exhibited in a preceding frame; and a display for displaying the adjusted progressive video signal.

18. The display system according to claim 17, wherein the image controller further includes a color management module for automatically adjusting chrominance data of an input pixel from the video signal.

* * * * *